United States Patent
Maier

[15] 3,694,866
[45] Oct. 3, 1972

[54] VEHICLE HOOK

[72] Inventor: Roy R. Maier, 3428 Tennyson St., San Diego, Calif. 92106

[22] Filed: Oct. 23, 1970

[21] Appl. No.: 83,286

[52] U.S. Cl..........24/115 J, 280/179 A, 105/369 A, 24/123 H, 248/361 A
[51] Int. Cl.........................F16g 11/00, F16g 11/14
[58] Field of Search...24/230 AM, 115 J, 123 H, 265 CD, 24/129; 248/361 A; 280/179, 179 A; 105/369 A; 114/218

[56] References Cited

UNITED STATES PATENTS

| | | |
|---|---|---|
| 3,190,253 | 6/1965 | Grimm..................105/369 A |
| 2,046,855 | 7/1936 | Tobin....................24/265 CD |
| 3,257,971 | 6/1966 | Swendsen..................24/129 |
| 2,623,477 | 12/1952 | Tuttle....................24/265 CD |
| 3,334,914 | 8/1967 | Vierregger............105/369 A |
| 3,482,291 | 12/1969 | Lehmann..............24/230 AM |
| 3,572,755 | 3/1971 | Baldwin................105/369 A |

Primary Examiner—Bernard A. Gelak
Attorney—Richard K. MacNeill

[57] ABSTRACT

A vehicle hook dimensioned for a substantially flush mounting in a cutout recess in the side of a pickup truck, for example, in which the hook portion is stamped from one flat piece of metal and a circular protrusion is dimensioned for being received by the cutout recess in the side of a vehicle's side panel such as a pickup truck, for example; the hook portion comprising a flat piece of metal with a cutout defining a tongue hook therein.

1 Claim, 2 Drawing Figures

PATENTED OCT 3 1972 3,694,866

INVENTOR.
ROY R. MAIER
BY
Richard K. Macnell

VEHICLE HOOK

BRIEF DESCRIPTION OF THE INVENTION

The present invention relates to a vehicle hook and more particularly to a vehicle hook which can be mounted substantially flush with the side of a vehicle.

According to the invention, a vehicle hook is provided in which a flat piece of metal has a U-shaped stamped out portion defining a tongue which is to be utilized as a hook. A cup is attached as by braising or welding to the back of the piece of stamped out metal which can be recessed into the side of a vehicle leaving the hook portion flush with the side of the vehicle.

An object of the present invention is the provision of a vehicle hook which can be mounted substantially flush to the side of a vehicle.

Another object of the invention is the provision of a vehicle hook which utilizes a stamped part.

A further object of the invention is the provision of a vehicle hook in which a back portion forms a well which is received by a recess in the side of a vehicle.

Yet another object of the invention is the provision of a vehicle hook which is inexpensive to manufacture and extremely simple to install.

Other objects and many of the attendant advantages of this invention will be readily appreciated as the same becomes better understood by reference to the following detailed description when considered in connection with the accompanying drawings in which like reference numerals designate like parts throughout the FIGS. thereof and wherein:

FIG. 1 is a perspective view of the preferred embodiment of the present invention in situ; and FIG. 2 is an exploded view of the present invention in proximity to a recess in the side of a vehicle.

DETAILED DESCRIPTION OF THE DRAWINGS

Figure 1:
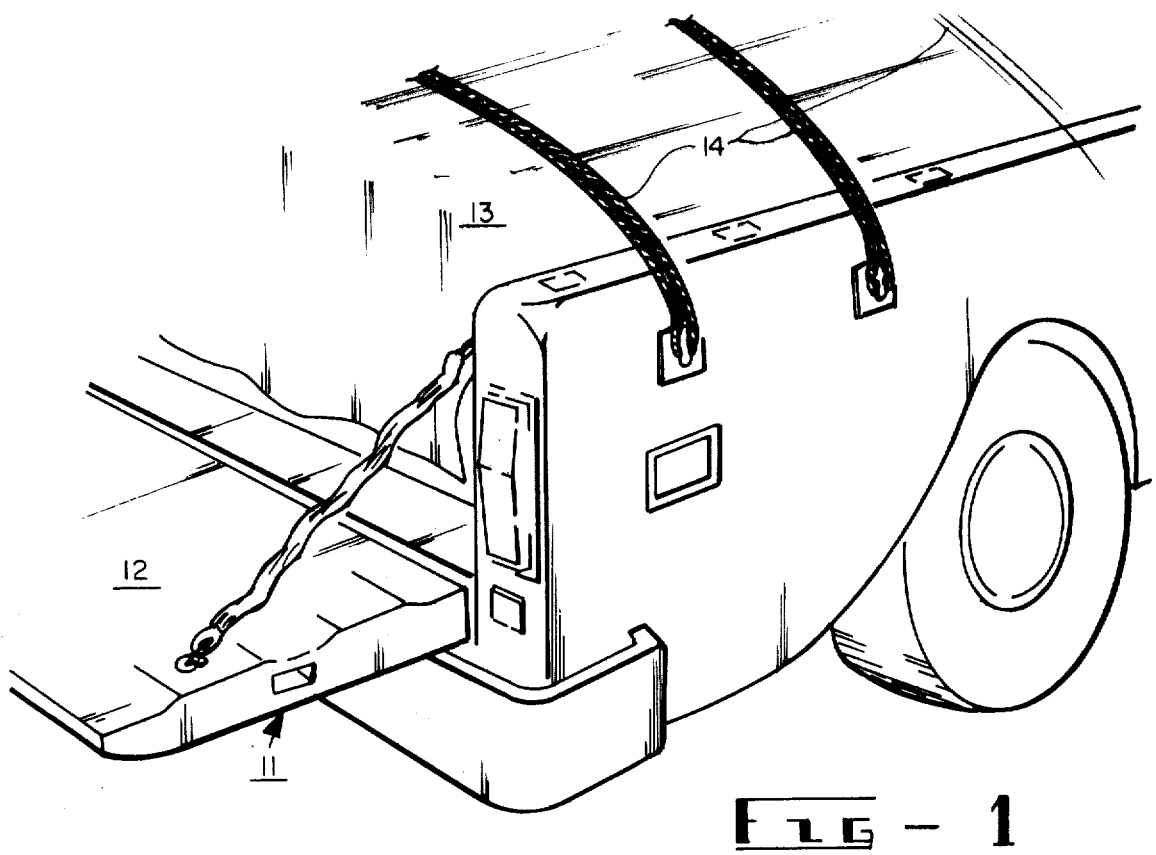

Referring to FIG. 1, a vehicle pickup truck is shown generally at 11 having a tailgate 12 with a cargo 13. Cargo 13 is tied down by lines 14 which, in turn, are carried by hooks 16.

Figure 2:
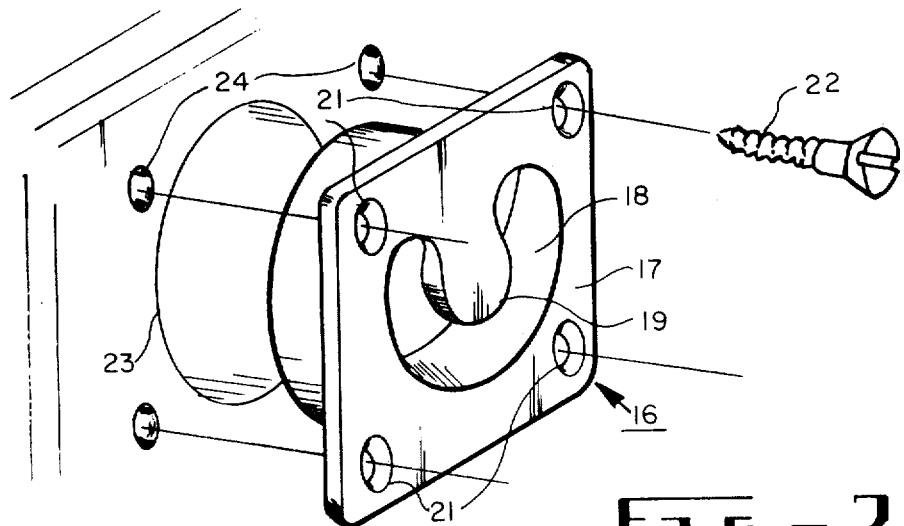

Referring to FIG. 2, hook 16 is shown having a flat portion 17 stamped out to form a tongue, or hook portion 19. A back portion 18 forms a well behind and around hook portion 19. Screw apertures 21 accommodate screw 22 in holes 24 in the vehicle. Back portion 18 is dimensioned for being received by a recess 23 in the vehicle.

Referring back to FIGS. 1 and 2, it can be seen that through the utilization of a flat stamped piece 17, a hook is formed and through the addition of a back portion 18, a well is formed behind the hook portion 19. The back portion 18, being dimensioned for reception by recess 23, leaves the entire assembly substantially flush with the side of a vehicle.

It should be understood of course that the foregoing disclosure relates to only a preferred embodiment of the invention and that it is intended to cover all changes and modifications of the example of the invention herein chosen for the purposes of the disclosure which do not constitute departures from the spirit and scope of the invention.

The invention claimed is:

1. A vehicle hook comprising:

a flat section of metal having a stamped cutout defining a tongue hook portion therein, said tongue hook portion being coplanar with said flat section of metal, and said flat section and hook portion having the same thickness, said tongue hook portion terminating in a substantially rounded head portion and a right circular cylindrical protrusion fixedly welded to said flat section of metal and surrounding said cutout portion on one side thereof, said protrusion defining a well behind said tongue hook portion and being dimensioned for being received in a recess in a side of a vehicle.

* * * * *